United States Patent [19]

Kato

[11] E Re. 28,821

[45] Reissued May 18, 1976

[54] PICK-UP TUBE ENVELOPE SEALANT EXTENDING INTO GROOVE OF ANNULAR TARGET SUPPORT

[75] Inventor: Ryuzo Kato, Kyoto, Japan

[73] Assignee: Matsushita Electronics Corporation, Japan

[22] Filed: Jan. 28, 1975

[21] Appl. No.: 544,751

Related U.S. Patent Documents

Reissue of:

[64] Patent No.: 3,714,488
Issued: Jan. 30, 1973
Appl. No.: 181,311
Filed: Sept. 17, 1971

[30] Foreign Application Priority Data

Sept. 19, 1970 Japan ..... 45-82324

[52] U.S. Cl. ..... 313/390
[51] Int. Cl.[2] ..... H01J 29/02; H01J 31/26
[58] Field of Search ..... 313/390, 366, 383, 482, 313/378

[56] References Cited

UNITED STATES PATENTS

| | | | |
|---|---|---|---|
| 3,073,981 | 1/1963 | Miller et al. | 313/65 A |
| 3,577,027 | 4/1971 | Szegho | 313/65 |
| 3,590,304 | 6/1971 | Moegenbier | 313/94 |

*Primary Examiner*—Robert Segal
*Attorney, Agent, or Firm*—Depaoli & O'Brien

[57] ABSTRACT

A target assembly of an image pick-up tube including a face plate hermetically fastened on one open end of a tubular envelope of the image pick-up tube through pressure welded binding member composed of indium which is interposed therebetween. A support member supporting therein a target substrate is mounted on the inner surface of the face plate and secured thereto through its peripheral wall combined with the binding member. On the peripheral wall is formed a groove extending circumferentially thereof. The binding member combines with the groove so that the support member favorably fastened to the face plate.

11 Claims, 3 Drawing Figures

PICK-UP TUBE ENVELOPE SEALANT EXTENDING INTO GROOVE OF ANNULAR TARGET SUPPORT

Matter enclosed in heavy brackets [ ] appears in the original patent but forms no part of this reissue specification; matter printed in italics indicates the additions made by reissue.

This invention relates to an image pick-up tube and more particularly to a target assembly of an image pick-up tube. The specific purpose of this invention is to provide a target assembly which has a robust construction and is readily fabricated without damage to its target substrate composed of a semiconductor material.

The target assembly of this invention is constructed at the end portion of a tubular envelope of an image pick-up tube, which includes a face plate hermetically fastened to the open end of the tubular envelope through pressure welding of an annular binding member composed of indium which is previously interposed therebetween.

An annular support member is mounted on the face plate and secured thereto by means of the binding member combined with the outer surface of the support member. It is important that the support member has on its outer surface a groove extending circumferentially thereof. The binding member melts into the groove so that the support member is robustly secured to the face plate.

The specific structure of this invention is read in conjunction with the drawing wherein.

Figure 1:
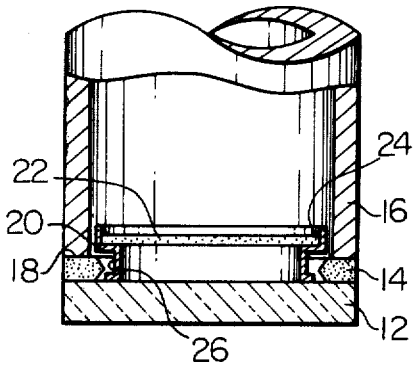
FIG. 1 is a sectional view of the target assembly of this invention showing construction thereof before application of pressure welding technique.

FIG. 1 shows an arrangement to be manufactured into a target assembly according to this invention, which comprises a transparent face plate 12. On one surface of the face plate 12 is disposed an annular binding member 14 composed of indium on which a tubular envelope 16 is placed at its one open end 18. An annular metallic support member 20 is placed and preferably fixed with e.g., water-glass on the surface of the face plate 12, which member carries therein a target substrate 22. The substrate 22 is seated on a offset inner wall of the support member 20 and fixed thereto by means of an electrically conductive paint or cement, or solder 24. The support member 20 has its peripheral wall had a groove 26 extending circumferentially thereof. The groove 26 preferably faces the inner wall of the annular binding member 14.

Figure 2:
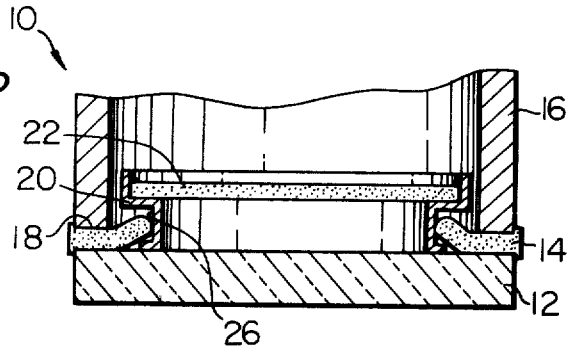
FIG. 2 is an enlarged sectional view of the target assembly of this invention after application of pressure welding technique.

A suitable pressure is applied between the face plate 12 and the tubular envelope 16 so to manufacture the arrangement into a target assembly of this invention as shown in FIG. 2. Through the application of such pressure, the binding member 14 is deformed and thus welded hermetically with the face plate 12 and the end 18. In this instance, the deformed binding member enters and welds to the groove 26 of the support member 20. Therefore, the metallic support member 20 is fastened on the face plate 12.

If desired, an amount of heat may be applied to the arrangement as well as the pressure for pressure-welding so as to make the binding member 14 readily enters the groove 26. The wall of the groove 26 may be plated with indium, tin, or the alloy thereof so as to increase the robustness of the welded connection of the groove 26 and the binding member 14.

Figure 3:
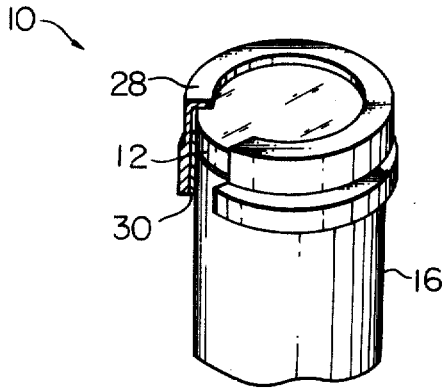
FIG. 3 is a perspective view of the target assembly capped with a signal ring.

FIG. 3 shows the assembly 10 of FIG. 2, which is capped with an annular signal ring in order to provide a robust construction and fine configuration of the target assembly. The signal ring 28 is fixed to the peripheral wall of the binding member 18 and the envelope 16, and serves as an output terminal of the image pick-up tube by means of conductive paint 30.

In this instance, it is to be noted that the tubular envelope 16 is hermetically sealed at the other end (not shown) so as to make a chamber to be evacuated for permitting an electron beam freely pass therethrough. The electron beam is deflected by a suitable means so as to scan the target substrate 22 thereby producing an electric image signal in the substrate in accordance with an optical image irradiated thereto through the face plate 12.

It is apparent from the above-description that the particular target assembly can be fabricated through only one pressing step and the susceptible target substrate is protected by the support member, so that, the target substrate does not damaged by external mechanical force or heat for the fabrication of the assembly. The target assembly according to this invention therefore has a high productivity.

What is claimed is:

1. A target assembly of an image pick-up tube including a tubular envelope, which comprises:

a transparent face plate;

an annular binding member welded both to the inner surface of said face plate and one open end of said tubular envelope;

an annular support member supporting therein a target substrate of said image pick-up tube mounted on the back surface of said face plate, said support member having on its peripheral wall a groove extending circumferentially of the peripheral wall which groove is combined with said binding member; and an annular signal ring capping said envelope and secured thereto through an electrically conductive paint, said signal ring being contacted at its inner surface to the peripheral wall of said binding member.

2. A target assembly according to claim 1, wherein the peripheral wall of said support member is plated with indium.

3. A target assembly according to claim 1, wherein the peripheral wall of said support member is plated with tin.

4. A target assembly according to claim 1, wherein the peripheral wall of said support member is plated with an alloy of indium and tin.

*5. A target assembly of an image pick-up tube including a tubular envelope, which comprises:*

*a transparent faceplate;*

*an annular binding member pressure-welded both to the inner surface of said faceplate and one open end of said tubular envelope;*

*an annular support member supporting therein a target substrate of said image pick-up tube mounted on the back surface of said faceplate, said support member having on its peripheral wall a groove extending circumferentially of said support member and being combined with said binding member; and*

*an annular signal ring coupled with said envelope and contacted at its inner surface to the peripheral wall of said binding member.*

*6. A target assembly according to claim 5, wherein the peripheral wall of said support member is plated with indium.*

*7. A target assembly according to claim 5, wherein the peripheral wall of said support member is plated with tin.*

*8. A target assembly of an image pick-up tube including a tubular envelope, which comprises:*

*a transparent faceplate;*

*an annular binding member pressure-welded both to the inner surface of said faceplate and one open end of said tubular envelope;*

*an annular support member supporting therein a target substrate of said image pick-up tube mounted on the back surface of said faceplate, said support member having on its peripheral wall a groove extending circumferentially of said support member and being combined with said binding member; and*

*an annular signal ring capping said envelope and contacted at its inner surface to the peripheral wall of said binding member.*

*9. A target assembly according to claim 1, wherein said binding member is made of indium.*

*10. A target assembly according to claim 5, wherein said binding member is made of indium.*

*11. A target assembly according to claim 8, wherein said binding member is made of indium.*

* * * * *